United States Patent
Pica

(10) Patent No.: US 6,418,380 B1
(45) Date of Patent: Jul. 9, 2002

(54) METHOD FOR SEISMIC PROCESSING AND IN PARTICULAR FOR THREE-DIMENSIONAL SEISMIC EXPLORATION USING SEISMIC DATA MIGRATION

(75) Inventor: Antonio Pica, Vanves (FR)

(73) Assignee: Compagnie Generale de Geophysique, Massy (FR)

( * ) Notice: Subject to any disclaimer, the term of this patent is extended or adjusted under 35 U.S.C. 154(b) by 0 days.

(21) Appl. No.: 09/319,102

(22) PCT Filed: Oct. 7, 1998

(86) PCT No.: PCT/FR98/02140

§ 371 (c)(1),
(2), (4) Date: May 28, 1999

(87) PCT Pub. No.: WO99/19750

PCT Pub. Date: Apr. 22, 1999

(30) Foreign Application Priority Data

Oct. 10, 1997 (FR) .......................................... 97 12691

(51) Int. Cl.[7] ................................................ G01V 1/28
(52) U.S. Cl. ...................................................... 702/18
(58) Field of Search .......................... 702/17, 18, 14; 367/73, 51

(56) References Cited

U.S. PATENT DOCUMENTS

| 5,062,086 A | * | 10/1991 | Harlan et al. ............... 367/73 |
| 5,394,325 A | | 2/1995 | Schneider, Jr. |
| 6,035,256 A | * | 3/2000 | Stankovic ................... 702/16 |
| 6,081,482 A | * | 6/2000 | Bevc ............................ 367/73 |

OTHER PUBLICATIONS

Vidale, Finite–difference calculation of traveltimes in three dimensions, Geophysics, vol. 55, No. 5, pp. 521–526 (May 1990), XP–002073147.

Faria et al, Traveltime computation in transversely isotropic media, Geophysics, vol. 59, No. 2, pp. 272–281 (Feb. 1994), XP–002073146.

Aldridge, Linearization of the eikonal equation, Geophysics, vol. 59, No. 10, pp. 1631–1632 (Oct. 1994), XP 002073148.

* cited by examiner

Primary Examiner—Donald E. McElheny, Jr.
(74) Attorney, Agent, or Firm—Duane Morris LLP

(57) ABSTRACT

A seismic processing method to solve an eikonal equation to determine a travel time (t) of a sound wave between a seismic source at a first set of coordinates ($x_2, y_2, z_2$) and a point underground at a second set of coordinates (x,y,z), comprising determining a distance between the seismic source and the point underground; obtaining a propagation time between the seismic source and the point underground; calculating a velocity variable (v) as a ration of the distance between the seismic source and the underground point divided by the propagation time between the seismic source and the point underground; and extrapolating on the velocity variable to obtain a travel time.

5 Claims, 2 Drawing Sheets

METHOD FOR SEISMIC PROCESSING AND IN PARTICULAR FOR THREE-DIMENSIONAL SEISMIC EXPLORATION USING SEISMIC DATA MIGRATION

FIELD OF THE INVENTION

The present invention relates to seismic processing methods and finds a particularly advantageous application in 3D seismic prospecting methods that implement seismic data migration.

DESCRIPTION OF THE RELATED ART

The need for higher quality imaging of seismic structures leads to the use of migration processing on seismic data prior to summing.

Unfortunately, a major problem encountered with seismic data migration lies in determining the travel time between a given position on the surface and a cube of positions at depth.

To obtain high quality migration processing, it is desirable to be able for high accuracy to be available on the calculated travel times.

However, although present processing makes highly satisfactory accuracy available, it suffers from the drawback of requiring a very large number of computation. The resulting computation time is particularly long.

For descriptions of various methods of solving the eikonal equation, reference can advantageously be made to the various following publications:

(1) Podvin P. and Lecompte I., 1991, Finite difference computation of travel times in very contrasted velocity models: a massively parallel approach and its associated tools: Geophys. J. Int., 105, 271–284;

(2) Schneider W., 1993, Robust, efficient upwind finite-difference travel time calculations in 3D: 1993 DEG Annual Meeting Expanded Abstracts;

(3) Fowler P., 1994, Finite-difference solutions of the 3D eikonal equation in spherical coordinates: 1994 SEG Annual Meeting Expanded Abstracts;

(4) Klimes L., 1996, Grid travel time tracing: second-order method for the first arrivals in smooth media, PAGEOPH: 148, 539–563, (5) Geoltrain S. and Brac J., 1993; Can we image complex structures with first-arrival travel times?: Geophysics, 51, 1685–1688;

(6) Nichols D. E., 1996, maximum energy travel times calculated in the seismic frequency band: Geophysics, 61, 253–263;

(7) Kessler D. and Canales L., 1995, Mixed-grid solution of the 3D eikonal equation: 1995 SEG Annual Meeting Expanded Abstracts;

(8) Mendes M., Morgado L. and Buxo A., 1997, Interpolation sensitivity of the 3D ASI: Final Report EEC Joule contract JOU2-CT93–0321, 3D Asymptotic Seismic Imaging, 251–266; and (9) Pica A., 1997, Maximum energy travel times and amplitudes calculated in a low frequency band: 1997 59th EAGE Conference Extended Abstracts.

An object of the invention is to propose processing that makes it possible to obtain high accuracy determinations in shorter times.

BRIEF DESCRIPTION OF THE FIGURES

Characteristics and advantages of the invention appear further from the following description. The description is purely illustrative and non-limiting and should be read with reference to the accompanying drawings, in which.

DETAILED DESCRIPTION OF AN EXEMPLARY EMBODIMENT

Figure 1:
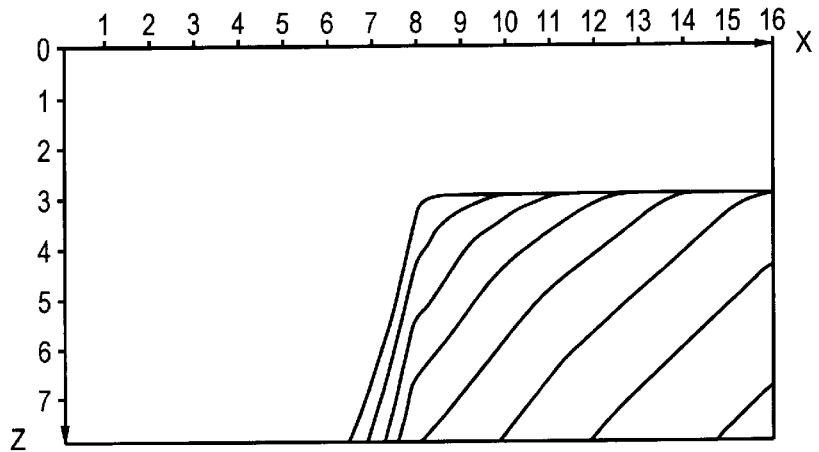
FIG. 1 is a plot showing iso-velocity contours in a diagram where the abscissa represents a surface direction and the ordinate represents the depth direction.

Conventionally, migration processing uses Kirchhoff integral summing calculations relying on an approximation to so-called "Green" functions in which the eikonal equation is solved by means of a finite difference calculation.

It is recalled that in Cartesian coordinates the eikonal equation is written as follows:

$$t_x^2 + t_y^2 + t_z^2 = 1/c^2$$

with $t_x = \delta t/\delta x$, $t_y = \delta t/\delta y$, and $t_z = \delta t/\delta z$ where $\delta t/\delta x$, $\delta t/\delta y$, and $\delta t/\delta z$ are estimates of the partial derivatives of the travel times relative to Cartesian coordinates x, y, and z, and where c represents the speed of propagation.

This eikonal equation is generally solved by performing an integration computation downwards along an axis z pointing down into the ground.

To solve the eikonal equation, it has been shown in publication (8) that higher accuracy can be obtained by replacing linear interpolation with a quadratic relationship associating propagation times at the coordinates both of a point under consideration and of a source point, i.e.:

$$t^2 = 1/c^2[(x-x_s)^2 + (y-y_s)^2 + (z-z_s)^2] = d^2/v^2 \qquad [1]$$

in which relationship:

d is the distance between the point under consideration of coordinates (x, y, z) and the source point of coordinates $(x_s, y_s, z_s)$;

t is the travel time; and v is a variable having the dimensions of speed and which is referred to as "velocity" throughout the specification below (to distinguish it from the propagation speed c).

Instead of interpolating for the time variable t, the invention proposes interpolating for the velocity variable v.

Thus, the invention provides a seismic processing method in which the eikonal equation is solved to determine the travel times of a sound wave between a seismic source and a point under ground, the method being characterized in that to solve the eikonal equation, extrapolation processing is performed on the velocity variable, which variable is equal to the ratio of the distance between the seismic source and the underground point divided by the propagation time between said source and said point.

The invention also provides a 3D seismic prospecting method in which:

seismic data is acquired by means of a sound source and seismic sensors, and the seismic data is processed by implementing migration of said data to obtain information concerning subsurface geology, the method being characterized in that to implement the migration processing, the travel times of the sound waves are previously determined by implementing the method as defined above.

Below, solution of the eikonal equation with velocity v as the unknown and in Cartesian coordinates is described for the case where integration is performed in the vertical direction.

Naturally, it will be understood that the eikonal equation with velocity v as the unknown can also be solved in other ways, in particular using integration in spherical coordinates or indeed along arbitrary paths.

With velocity v as the variable, the eikonal equation in Cartesian coordinates is written as follows:

$$d^2/v^2(v_x^2+v_y^2+v_z^2)-2/v(xv_x+yv_y+zv_z)+1-v^2/c^2=0 \quad [2]$$

where $v_x$, $v_y$, and $v_z$ are the partial derivatives of the velocity v relative to the axes x, v, and z and are the new unknowns.

In equation [2], it can be seen that:
when integrating through a homogeneous medium, where v and c are constant and equal, the partial derivatives of v relative to the axes x, y, and z are equal to 0; travel time t=d/v can be determined exactly, i.e. with 100% accuracy; and when integrating through a heterogeneous medium, i.e. through a medium in which propagation speed c varies with position, then velocity v also varies, but it does so more slowly than does travel time. This is illustrated by comparing FIGS. 1 and 2.

Consequently, it will be understood that for similar accuracy, the eikonal equation can be solved using a much slacker sampling interval than when solving equation [1] using time as the variable.

More precisely, equation [2] can be solved by extrapolating finite differences along the vertical z axis downwards into the ground starting from surface values v(x, y, z=0), with the expression $v_z$ being integrated as a function of the partial derivatives $v_x$ and $v_y$.

Algorithm stability is ensured by choosing an integration step size dz that is smaller than the horizontal sampling interval, and by using a three-term smoothing filter in the directions x and y (with bandwidth proportional to the ratio between vertical and horizontal sampling intervals).

This kind of digital processing cannot process propagation angles greater than arctan(dx/dz) or arctan(dy/dz). At greater angles up to 90°, four 2D extrapolations are implemented for each point, using the same algorithm, but reduced to 2D. These extrapolations are performed in four horizontal half-planes (positive x, negative x, positive y, and negative y) using the projection of the horizontal source as the origin.

Thereafter the shortest travel time between the result of the extrapolation in the downward direction and the result of the four horizontal extrapolations is selected.

Processing of the type described above makes it possible to achieve results of very great accuracy using large sampling intervals in the horizontal directions. The size of the sampling interval is restricted only by the need to take account of the variations of lateral speed in the speed models input to the computation, which generally means that the sampling interval must be smaller than 100 meters.

It will be solved that resolution by downward integration has the advantage of making it possible to eliminate the rising paths of the waves (mainly refracted waves).

Also, in order to eliminate post-critical reflections, it is advantageous to implement a second pass of the integration processing, this time in an upwards direction.

Also, selecting the minimum travel time between the result of integration in the downward direction and the 2D updating can show up new refracted waves at each new depth.

The appearance of these refracted waves can be prejudicial, particularly in zones where lateral speed contrasts are vertically invariant, which corresponds to geological situations that are not uncommon (e.g. vertical salt walls, cliffs due to faults).

To attenuate the consequences of such circumstances, the processing ensures that the angle between the vertical direction and the travel time gradient vector does not have values smaller than the angle between the vertical direction and the radial vector connecting the source to the point under consideration. This constraint is imposed by modifying the values of $v_x$ and $v_y$ in the expression for $v_z$.

Figure 3:
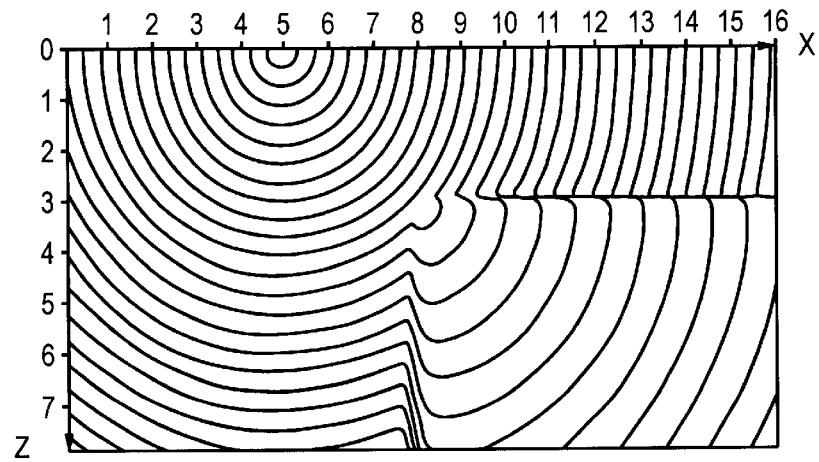
FIG. 3 is a plot having the same abscissa and ordinate as FIG. 1, showing isochrones determined by processing in accordance with another implementation of the invention.
Figure 4:
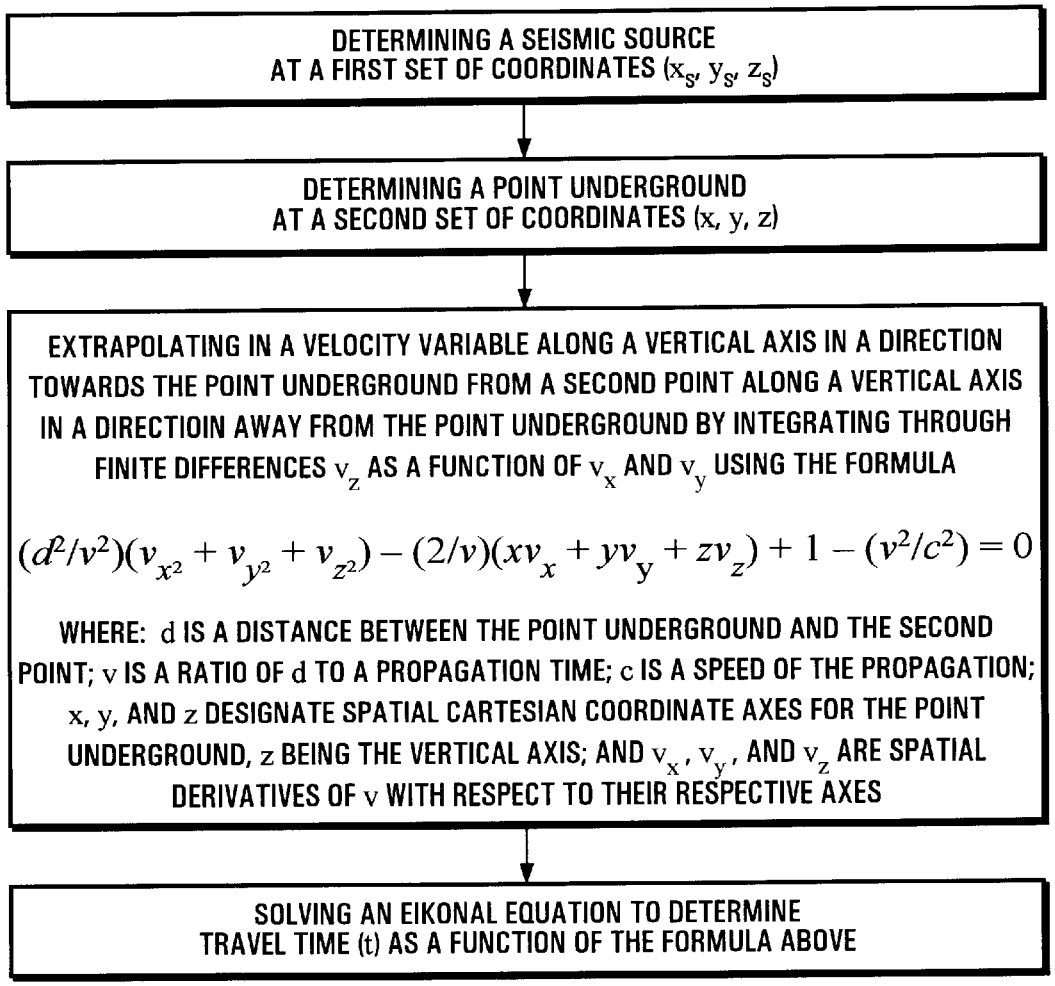
FIG. 4 is a flowchart of an exemplary embodiment of the method of the present invention.

FIG. 3 shows the isochrones obtained after this kind of processing.

Figure 2:
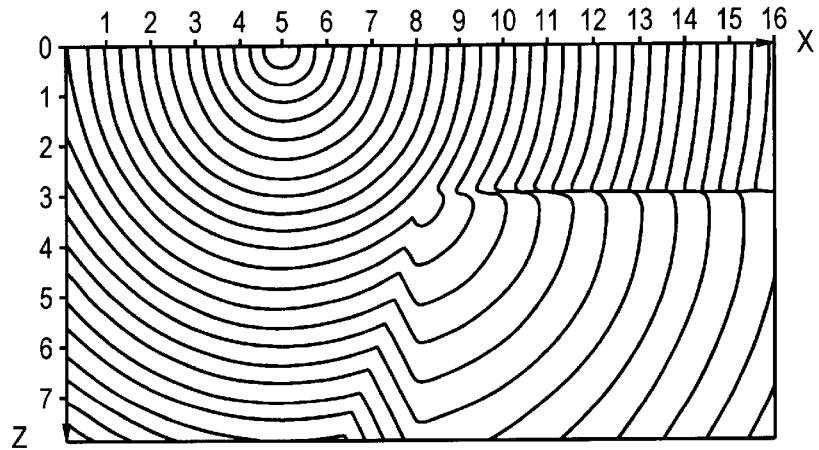
FIG. 2 is a plot having the same abscissa and ordinate as FIG. 1, showing isochrones determined by processing in accordance with one implementation of the invention.

FIG. 3 should be compared with FIG. 2 which shows the same isochrones as obtained using the processing proposed by the invention but without imposing the above-specified angular constraint.

It will be observed that FIG. 2 corresponds to solving the eikonal equation using the velocity variable as the unknown in a volume of 16 km×16 km×8 km sampled every 100 m in the x, y, and z directions. This resolution takes 150 seconds on an IBM Risk6000-25 W or 25 seconds on an SPP1600 processor. Accuracy is of millisecond order.

Consequently, the computation time required is not large, thereby making it possible to recompute travel times should that be desired.

The processing proposed by the invention also makes it possible to obtain improved overall inversions of the resulting image.

As explained above, solving the eikonal equation in Cartesian-coordinates can naturally be replaced by solving using other coordinates, and in particular spherical coordinates. In which case, there is no need to associate the extrapolation with extrapolation in 2D.

It will also be observed that by working on velocity rather than on its inverse, sensitivity to digital error in the finally computed travel times is made smaller.

What is claimed is:

1. A seismic processing method to solve an eikonal equation to determine a travel time (t) of a sound wave between a seismic source at a first set of coordinates $(x_s, y_s, z_s)$ and a point underground at a second set of coordinates (x,y,z), comprising:

a. extrapolating on a velocity variable along a vertical axis in a direction towards the point underground from a second point along a vertical axis in a direction away from the point underground by integrating through finite differences $v_z$ as a function of $v_x$ and $v_y$ using the formula $$\left(\frac{d^2}{v^2}\right)(v_{x^2} + v_{y^2} + v_{z^2}) - \left(\frac{2}{v}\right)(xv_x + yv_y + zv_z) + 1 - \left(\frac{v^2}{c^2}\right) = 0$$

wherein
i. d is a distance between the point underground and the second point;
ii. v is a ratio of d to a propagation time;
iii. c is a speed of the propagation;
iv. x, y, and z designate spatial Cartesian coordinate axes, z being the vertical axis; and
v. $v_x$, $v_y$, and $v_z$ are spatial derivatives of v with respect to their respective axes; and b. determining the travel time (t) as a function of step (a).

2. A method according to claim 1, wherein the extrapolation processing of step (a) further comprises:
   i. extrapolating in a downward direction associated with horizontal 2D extrapolations; and
   ii. selecting a shortest time from the times that result from the extrapolation in the downward direction and extrapolation in the 2D horizontal directions as the travel time (t) at the end of the processing.

3. A method according to claim 2, wherein the extrapolation processing is also performed in the upward direction along the z axis.

4. A method according to claim 1, wherein the extrapolation processing is implemented in spherical coordinates.

5. A 3D prospecting method for a system comprising a sound source and at least one seismic sensor, the method comprising:
   a. acquiring seismic data from the sound source and the at least one seismic sensor; and
   b. processing the seismic data by implementing migration of the data to obtain information concerning subsurface geology, the processing comprising:
      i. extrapolating on a velocity variable along a vertical axis in a direction towards the point underground from a second point along a vertical axis in a direction away from the point underground by integrating through finite differences $v_z$ as a function of $v_x$ and $v_y$ using the formula $$\left(\frac{d^2}{v^2}\right)(v_{x2} + v_{y2} + v_{z2}) - \left(\frac{2}{v}\right)(xv_x + yv_y + zv_z) + 1 - \left(\frac{v^2}{c^2}\right) = 0$$

wherein
   (1) d is a distance between the point underground and the second point;
   (2) v is a ratio of d to a propagation time;
   (3) c is a speed of the propagation;
   (4) x, y, and z designate spatial Cartesian coordinate axes, z being the vertical axis; and
   (5) $v_x$, $v_y$, and $v_z$ are spatial derivatives of v with respect to their respective axes; and
      ii. determining the travel time (t) as a function of step (b)(ii).

* * * * *